United States Patent
Reynolds

[15] 3,702,958

[45] Nov. 14, 1972

[54] VARIABLE CAPACITOR

[72] Inventor: Wayne H. Reynolds, Park Ridge, Ill.

[73] Assignee: Zenith Radio Corporation, Chicago, Ill.

[22] Filed: Feb. 7, 1964

[21] Appl. No.: 343,281

[52] U.S. Cl. .................................317/253, 325/355

[51] Int. Cl. ............................................H01g 5/06

[58] Field of Search......325/355, 357, 453, 459, 462, 325/464; 334/43, 45, 64, 79, 80, 82, 83, 1, 2, 3; 317/253

[56] References Cited

UNITED STATES PATENTS

| | | | |
|---|---|---|---|
| 2,819,391 | 1/1958 | Reiches | 334/43 X |
| 2,858,440 | 10/1958 | Giacoletto | 334/82 X |
| 2,995,655 | 8/1961 | Meadows et al. | 325/459 X |
| 3,015,766 | 1/1962 | Repko | 317/253 |
| 3,252,096 | 5/1966 | Carlson | 325/459 |
| 3,275,958 | 9/1966 | Rehm et al. | 334/3 |

*Primary Examiner*—E. A. Goldberg
*Attorney*—John J. Pederson and Cornelius J. O'Connor

[57] ABSTRACT

A continuously adjustable UHF tuner has a multi-compartmented housing each of which has a tunable frequency selector. These selectors are essentially identical to one another in respect of dimension and configuration. Each is made up of a multi-turn inductor which, in conjunction with the compartment walls, constitutes an approximately quarter-wave transmission line at the high frequency end of the tuning band and also of an adjustable capacitor for tuning the selector over a band equal in width to the UHF band. The capacitor has both stationary and movable electrodes. The former is an extension of an end turn of the inductor and the latter has a main body portion and another portion which is located at one end of the main body portion and is adjustable transversely relative thereto. The movable electrode has a first extreme position which is one of minimum capacitance and in which the aforesaid other portion of the movable electrode is the predominant tuning adjustment and is used to establish the high frequency end of the tuning range. The other extreme or maximum capacitance position of the movable electrode determines the low frequency end of the tuning range and a control shaft permits displacement of the movable electrode between these two extreme positions to tune the selector over its range.

4 Claims, 4 Drawing Figures

INVENTOR.
Wayne H. Reynolds
BY
Cornelius J. Connor
Atty.

VARIABLE CAPACITOR

This invention relates in general to wave signal tuners and in particular to an improved continuous type tuner for the UHF television band.

Under present allocations there are two rather widely spaced bands in the radio frequency spectrum which are reserved for television broadcasting. The first, a relatively low frequency band, is designated the VHF band and it accommodates twelve channels; five having frequency assignments between 54 and 88 megacycles and seven between 174 and 216 megacycles. The second band is the relatively high frequency UHF band which accommodates seventy television channels at 6 megacycle intervals between 470 and 890 megacycles.

In view of the relatively few (12) channels in the VHF band, either a turret or a switch type tuner, that is, a tuner having a discrete-stop or position for each channel, is feasible. Insofar as UHF is concerned, however, a discrete-stop tuner is obviously impractical because of the number of positions (70) that would be required. While tuning strips tailored to individual UHF channels are available for use in turret type VHF tuners, the total number of UHF and VHF stations that can be accommodated is limited, of course, to the number of strips which may be accommodated on the turret.

In view of the aforementioned mechanical considerations, the prior art has invariably resorted to a continuous type tuner for receivers designed to accommodate the entire UHF band. The frequency determining circuits for such tuners, however, pose special design problems since conventional lumped constant circuit elements, which ordinarily suffice at VHF, do not function properly at UHF. This is due to the fact that the physical dimensions of such components become an appreciable fraction of the wavelength of UHF signals, and particularly is this the case in the upper reaches of the UHF band. This, in turn, dictates recourse to distributed constant elements, such as tunable transmission lines, for use in the frequency determining circuits.

A conventional tuned-line UHF tuner of the type above-mentioned comprises one or more RF preselector stages, a vacuum tube oscillator stage and a mixer circuit which develops an IF or difference frequency signal by heterodyning a selected RF signal with the oscillator signal. It is conventional practice to use substantially identical quarter-wave transmission line elements, which are tuned by rotatably supported capacitor electrodes, in each of the preselector stages while employing a tunable half-wave line in the oscillator stage. While the operating frequency of the oscillator throughout most of its range is primarily controlled by the tuning capacitor, it is also conventional prior art practice to employ separate trimmer capacitors to insure that the upper and lower limits of the UHF range can be readily tuned. Specifically, when the tuning capacitor is positioned for minimum capacitance, one trimmer capacitor is adjusted to tune the oscillator to the high frequency end of the band. On the other hand, when the tuning capacitor is positioned for maximum capacitance, a second trimmer capacitor is adjusted so as to establish the lower frequency limit of the oscillator. In like fashion, the upper tuning range of the preselector stages is determined by a separate trimmer capacitor in each stage. All of these expedients, while effective, are undesirably costly and complex, both as to component requirements and assembly and alignment procedures in production.

It is therefore a principal object of the invention to provide a new and improved multi-stage UHF television tuner.

It is also an object of the invention to provide a UHF tuner construction which requires a minimum number of component parts.

It is another object of the invention to provide a continuous UHF television tuner of a unique and economical construction.

A continuously adjustable UHF tuner constructed in accordance with the invention comprises a housing which has a plurality of compartments each of which includes a signal translating stage. A control shaft extends through each of the compartments and is rotatably supported by the end walls of the housing. The tuner also includes a corresponding plurality of tunable frequency selector circuits, one for each stage and each comprising an inductor having an electrical length which approaches one quarter of a wavelength at the high frequency end of the UHF band. Each tunable circuit further includes a capacitor having a stationary electrode constituted by an extension of the inductor and an assigned pair of spaced electrodes which are affixed to the control shaft for rotational displacement from a position overlapping and embracing the stationary electrode to a position remote therefrom. All of the displaceable electrodes have a substantially identical configuration and at least one of each of the displaceable electrode pairs has an adjustable tab for establishing, in conjunction with its assigned stationary electrode, the principal tuning capacitance for its associated frequency selector circuits at the high frequency end of the UHF band.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2, 3, 4:
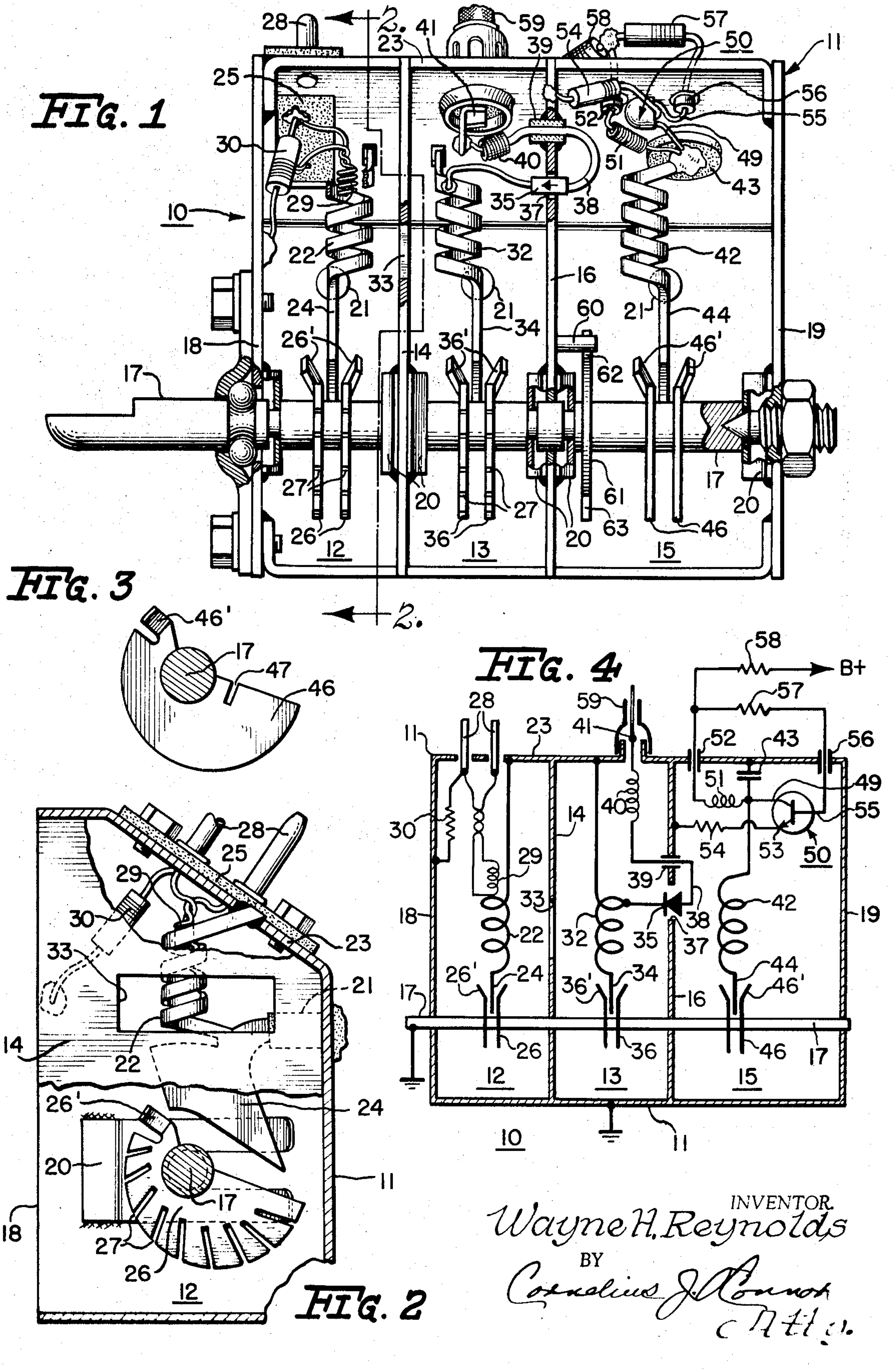
FIG. 1 is an elevation view, in section, of a continuous type UHF television tuner embodying the invention.
FIG. 2 is a sectional view of the tuner taken along lines 2—2 of FIG. 1.
FIG. 3 is a detail view, partly in cross section, of one component of the UHF tuner shown in FIG. 1.
FIG. 4 is a schematic diagram of the UHF tuner.

Referring now specifically to FIGS. 1 and 2, the continuously adjustable UHF tuner 10 shown therein comprises a metal housing 11 which encloses a plurality of signal translating stages. More particularly, tuner 10 includes first and second RF preselector stages 12, 13, respectively, separated by a compartment wall 14, and an oscillator stage 15 shielded from preselector 13 by a wall 16. A control shaft 17 extends through the compartments and is rotatably journaled upon bearings supported by the end walls 18, 19 of the housing. Shaft 17 is conductively connected to end walls 18, 19 and to compartment walls 14, 16 by a series of grounding leaves 20 each of which has one end soldered to a housing or compartment wall and an intermediate portion seated within an under cut portion of shaft 17, see FIG. 2.

Preselector stage 12 includes a tunable frequency selector circuit comprising an inductor 22 having an electrical length which approaches one quarter of a wave length at the high frequency end of the UHF band. One end of inductor 22 is conductively secured to the top wall 23 of housing 11 while the other end terminates in a planar extension 24 which is supported by a post 21 of insulating material, see FIG. 2. In this fashion inductor 22 constitutes the inner conductor of a coaxial transmission line while the housing and bordering walls form the outer conductor.

Extension 24 serves as the stationary electrode of a tuning capacitor which also includes a pair of spaced electrodes 26 which are soldered, staked or otherwise conductively affixed to control shaft 17 for rotational displacement in a plane parallel to stationary electrode 24 from a position overlapping and embracing the stationary electrode to a position remote therefrom. The latter position is illustrated in FIG. 2. Electrodes 26 are of identical arcuate configuration and each includes an adjustable tab 26', preferably struck or formed along one edge of the electrode itself. As will be explained more completely below, tabs 26' together with electrode 24 serve to establish the principal tuning capacitance for preselector 12 at the high frequency end of the UHF band. Additionally, each of electrodes 26 has a plurality of canted knifing slots 27 to facilitate tuning preselector 12 so that it will "track" or follow oscillator stage 15 when the latter is tuned across the UHF band.

Preselector 12 also includes an antenna input circuit comprising a pair of UHF antenna terminals 28 which are mounted on a panel 25 of insulating material atop housing 11 and are coupled to inductor 22 via a coil 29. One of terminals 28 is returned to a plane of reference potential, housing 11, through a resistor 30 which provides a leakage path for any static charge accumulating on the antenna.

The tunable frequency selector circuit for preselector 13 comprises an inductor 32 which is similar in length and configuration to inductor 22 and is coupled thereto through a window 33 in compartment wall 14. Inductor 32 also has one end grounded to top wall 23 of the housing and a free end formed into a planar extension 34 which is supported by a post 21 thus permitting inductor 32 to serve as the inner conductor of a coaxial transmission line of which compartment walls 14, 16 and housing 11 constitute the outer conductor. Extension 34 is of the same size and configuration as extension 24 and is in alignment therewith as viewed along shaft 17.

Preselector line 32 is tuned by a capacitor which includes inductor extension 34 as a stationary electrode and a pair of adjustable electrodes 36 which are conductively affixed to shaft 17 in axial alignment with electrodes 26 and displaceable over the same limits as electrodes 26. Electrodes 36 are identical in configuration to electrodes 26 even to the extent of having similar slots 27 and adjustable tabs 36' which, together with stationary electrode 34, constitute the principal tuning capacitance for preselector 13 at the high end of the UHF band.

Preselector compartment 13 further includes a mixer diode 35 having one lead connected to a tap on inductor 32 and a second lead protruding through an aperture 37 in compartment wall 16 to form a coupling loop 38 which is connected to the center lead of a feed-through capacitor 39 mounted in wall 16. An IF output coil 40 is connected between the center lead of feed-through capacitor 39 and the center terminal of an IF output jack 41. Jack 41 is coupled to a television receiver, now shown, via a coaxial cable 59.

As is apparent in FIG. 1, capacitor electrodes 26, 36 are mounted symmetrically relative to the walls of their respective compartments. This, of course, permits a measure of control over stray capacitances by equalizing the effects of the strays between the capacitor electrodes and the compartment.

On the other hand, inductors 22, 32 are not symmetrically disposed relative to their compartments in that their center sections are offset relative to their respective extensions 24,34. Although the inductors are substantially identical in length, inductor 32 constitutes, in effect, a mirror image of inductor 22 rather than being identical in configuration. In this fashion their electrode extensions 24, 34 remain centered in their respective compartments while the inductor portions assume positions which provide a desired magnitude of mutual coupling commensurate with the smallest feasible opening for window 33.

Oscillator stage 15 also includes a tunable frequency selector circuit comprising an inductor 42 having an electrical length approaching a quarter wave length at the high frequency end of the UHF band. The low impedance end of inductor 42 is coupled to wall 23 of the housing through a capacitor 43 while its opposite end is formed into a planar extension 44 which is supported by a post 21 and disposed in alignment with preselector extensions 24, 34. Inductor 42 together with housing 11 and walls 16, 19 form a third capacity-tuned coaxial transmission line. Except for the fact that its low impedance extremity is turned back to accommodate a connection to capacitor 43, see FIG. 1, inductor 42 is substantially identical in length and configuration to inductor 32. The tuning capacitor for the oscillator stage comprises inductor extension 44 as a stationary electrode and the pair of adjustable electrodes 46 which are conductively secured to shaft 17 in alignment with preselector electrodes 26, 36 for displacement in the same manner as those electrodes. While they do not have the canted knifing slots found in electrodes 26, 36, each of electrodes 46 does have a single tuning slot 47 which is located outside that area of the electrode which confronts stationary electrode 44 and is disposed normal to the straight edge of the electrode, see FIG. 3. In other respects, electrodes 46 are identical in configuration to preselector electrodes 26, 36 and, in like fashion, include adjustable tab portions 46' which cooperate with stationary electrode 44 to establish the tuning capacitance for the oscillator at the high frequency end of the UHF band.

As previously noted each of preselector stages 12, 13 and oscillator 15 also employ substantially identical inductors 22, 32 and 42, respectively. Therefore, insofar as the major components are concerned, the three stages are identical. It is appreciated, of course, that oscillator stage 15 must operate at a frequency which is displaced 40 megacycles from and preferably above, the operating frequency of the preselector stages. The oscillator stage maintains this frequency separation by virtue of capacitor 43 which is disposed in series relation with tuning capacitor 46, 46' thereby reducing the total capacitance of the oscillator stage and permitting tuning to a higher frequency.

The low impedance end of inductor 42 is directly connected to the output electrode or collector 49 of a grounded-base NPN transistor oscillator 50. By employing a low impedance oscillating device such as a transistor, a quarter-wave line or inductor is feasible. Collector 49 is connected to a source of unidirectional potential B+ via a decoupling choke 51, a feed-through capacitor 52 which is mounted in the top wall of housing 11, and a voltage dropping resistor 58. The emitter electrode 53 of transistor 50 is returned to reference potential housing 11, through a current-limiting bias resistor 54 which also serves to isolate the emitter from RF energy. The base or control electrode 55 is connected to B+ potential through a feed-through capacitor 56, a resistor 57 and resistor 58.

It is recognized, of course, that a PNP transistor can be substituted for transistor 50 simply by reversing the return connections of choke coil 51 and bias resistor 54. More particularly, such a substitution would merely entail returning collector choke 51 to reference potential and then connecting emitter resistor 54 through feed-through capacitor 52 to B+.

Located within the oscillator compartment is a range or limit control comprising a post 60 anchored to compartment wall 16 and a stop 61 which is affixed to shaft 17 and includes a pair of abutments 62, 63 which cooperate with post 60 to confine the rotation of shaft 17 to an angular displacement of approximately 200°, the travel required by capacitor electrodes 26, 36, 46 to tune their associated inductors across the UHF band.

UHF tuner 10 is actuated by a viewer control knob which is coupled to shaft 17 through a conventional gear reduction and vernier mechanism, now shown. Initially, however, tuner 10 must be set-up or phased by a test procedure which establishes the correct tuning range for each of the several stages. An acceptable procedure entails energizing transistor 50 and then rotating shaft 17 counterclockwise, as viewed in FIG. 2, until abutment 62 of the limit control encounters post 60. Transistor 50 functions as a conventional grounded-base oscillator and develops an output signal across frequency determining circuit 42, 44, 46. RF oscillator energy is coupled from this circuit to mixer diode 35 through loop 38. With shaft 17 so positioned, oscillator inductor 42 is tuned, principally by adjusting the proximity of electrode tabs 46' to electrode 44, to a frequency near the high end of the UHF band.

The frequency range of the oscillator is then adjusted by coupling the output of a sweeping generator to antenna terminals 28. In addition to an UHF signal varying in frequency above and below UHF channel 83, the output of the sweeping generator also includes a marker pulse which identifies the video carrier for channel 83. This sweeping signal is coupled to inductor 22 of preselector 12 through coil 29 and from there to inductor 32 of preselector 13 through coupling window 33. A portion of this signal is also injected into mixer diode 35 by virtue of the tap on inductor 32. To the output of diode 35 is externally added a pair of markers which are separated by 4½ megacycles and represent video and sound IF carriers. This composite signal is then externally detected and applied to the terminals of an oscilloscope. The displayed pattern shows the channel 83 marker, as well as the sound and video IF carriers, and also gives an indication of the pass band of preselector stages 12 and 13. The frequency of oscillator 15 is adjusted for the high end of the UHF band by positioning electrode tabs 46' relative to electrode 44 until the channel 83 marker on the scope pattern is properly disposed in relation to the sound and video IF markers. The pass bands of preselectors 12, 13 are then adjusted by positioning their respective electrode tabs 26', 36' relative to electrodes 24, 34 until a desired pass band is displayed on the scope.

The oscillator is next adjusted for the low end of the band by rotating tuning shaft 17 until stop abutment 63 engages post 60. The previously described procedure is then repeated using a sweep signal centered about UHF channel 14. The oscillator frequency is now adjusted by inserting a tuning wand in slots 47 of electrodes 46 and positioning those electrodes relative to electrode 44 until the scope pattern reveals proper oscillator frequency at the low end of the band.

Tracking of the oscillator across the UHF band by the preselector stages is then checked by returning tuning shaft 17 to the channel 83 position. Tracking is accomplished by successively positioning control shaft 17 to tune in a series of stations in the UHF band. More particularly, shaft 17 is rotated clockwise, as viewed in FIG. 2, to a position corresponding to UHF channel 75, for example, at which station a sweep signal having a frequency centered about that channel is coupled to antenna terminals 28. Preselector stages 12, 13 are then "tracked" to the oscillator by inserting a tuning wand alternately in the slots 27 of capacitor electrodes 26, 36 and bending the section of the electrode adjacent the slot, i.e., "knifing" the rotor elements, until a pattern of desired band pass is displayed on the oscilloscope. Control shaft 17 is then rotated to another position where the above procedure is repeated a second time. The knifing procedure is repeated for as many channels as is required to achieve proper tracking of the preselector circuits.

As shown prior art trimmer type capacitors are eliminated by resort to the disclosed electrode-tab arrangement in the frequency determining circuits of the several stages. Moreover, a substantial economy is achieved by forming electrodes 26, 36 and 46 from the same tool. This procedure also eliminates any tuning discrepancies attributable to differences in electrode size or configuration. Moreover, by forming these electrodes from the same tool any change in electrode size or configuration due to tool wear will not affect one stage any differently than any other since all the electrodes will retain an identical shape and configuration.

In another aspect, section 12, for example, of the UHF tuner of the present invention comprises a variable capacitor including cooperating rotor and stator capacitor plates 26 and 24 respectively, the rotor plates 26 being mounted for rotary movement with respect to stator plate 24 between a first position wherein the capacitance of the capacitor is at a minimum and a second position wherein the capacitance of the capacitor is at a maximum. Each of the rotor plates 26 has a main part and an auxiliary part 26', and only the auxiliary part of the rotor plate 26 is opposite the stator plate 24 when the capacitor is in its minimum capacity position. Auxiliary parts 26' of rotor plate 26 is adjustable toward and away from the stator plate 24, thereby to allow the minimum capacitance of the capacitor to be adjusted. Auxiliary part 26' of rotor plate 26 is not opposite stator plate 24 when the capacitor is in its maximum capacity position. The variable capacitor further comprises means for preventing an abrupt change in the capacitance characteristic of the capacitor at the point where auxiliary part 26' of rotor plate 26 ceases to be opposite stator plate 24, such means constituting the bottom tapered edge of stator plate 24 which is non-parallel or forms an angle with the edge of auxiliary part 26' of rotor plate 26 as the rotor is turned clockwise to the point that auxiliary part 26' departs from confronting relationship with stator plate 24. It will be observed that rotor plates 26 are provided with means in the form of slots 27 to form calibrating electrodes, and that auxiliary part 26' has a size and configuration different from that of any of the individual calibrating electrodes.

By the same token resort to a low impedance device for the oscillator stage, transistor 50, permits use of substantially identical tuned quarter-wave lines, inductors 22, 32, 42, in each frequency selector circuit. The savings which accrue as a result of employing substantially identical components in each of the three stages of the tuner contribute not only to economy in component cost but also a reduction in labor cost because of the resultant simplicity in manufacturing the tuner.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A variable capacitor comprising two cooperating capacitor plates mounted for movement with respect to each other between a first position wherein the capacitance of the capacitor is at a minimum and a second position wherein the capacitance of the capacitor is at a maximum, one of said capacitor plates having a main part and an auxiliary part, only said auxiliary part of said one capacitor plate being opposite the other of said capacitor plates when the capacitor is in said first position thereof, said auxiliary part of said one capacitor plate being adjustable toward and away from said other capacitor plate, thereby to allow the minimum capacitance of the capacitor to be adjusted, said auxiliary part of said one capacitor plate being not opposite said other capacitor plate when the capacitor is in its second position, said capacitor further comprising means for preventing an abrupt change in the capacitance characteristic of the capacitor at the point where said auxiliary part of said one capacitor plate ceases to be opposite said other capacitor plate.

2. A capacitor in accordance with claim 1 in which said other capacitor plate is configured to constitute said means.

3. A capacitor as defined in claim 1 wherein said one capacitor plate is provided with means forming calibrating electrodes and wherein said auxiliary part has a size and configuration different from that of said calibrating electrodes.

4. A capacitor as defined in claim 1, said capacitor being a rotary capacitor and said one capacitor plate being a rotatably mounted capacitor plate.

* * * * *